(12) United States Patent
Yasufuku

(10) Patent No.: US 8,943,101 B2
(45) Date of Patent: Jan. 27, 2015

(54) KEYWORD ACQUIRING DEVICE, CONTENT PROVIDING SYSTEM, KEYWORD ACQUIRING METHOD, A COMPUTER-READABLE RECORDING MEDIUM AND CONTENT PROVIDING METHOD

(71) Applicant: Dwango Co., Ltd., Chuo-ku, Tokyo (JP)

(72) Inventor: Kazuki Yasufuku, Tokyo (JP)

(73) Assignee: Dwango Co., Ltd. (JP)

( * ) Notice: Subject to any disclaimer, the term of this patent is extended or adjusted under 35 U.S.C. 154(b) by 0 days.

(21) Appl. No.: 13/671,968

(22) Filed: Nov. 8, 2012

(65) Prior Publication Data

US 2013/0124571 A1    May 16, 2013

(30) Foreign Application Priority Data

Nov. 11, 2011  (JP) ................. 2011-247694

(51) Int. Cl.
- *G06F 17/30* (2006.01)
- *G06F 7/00* (2006.01)
- *H04N 21/25* (2011.01)
- *H04N 21/258* (2011.01)
- *H04N 21/658* (2011.01)
- *H04N 21/84* (2011.01)

(52) U.S. Cl.
CPC .... *G06F 17/30961* (2013.01); *G06F 17/30035* (2013.01); *H04N 21/251* (2013.01); *H04N 21/25891* (2013.01); *H04N 21/6581* (2013.01); *H04N 21/84* (2013.01)

USPC .......................................... 707/797

(58) Field of Classification Search
USPC ................... 706/47; 707/797, 3, 1, E17.087
See application file for complete search history.

(56) References Cited

U.S. PATENT DOCUMENTS

| | | | |
|---|---|---|---|
| 8,326,861 B1 * | 12/2012 | Ainslie et al. ................ 707/768 |
| 2003/0140038 A1 * | 7/2003 | Baker et al. ........................ 707/3 |
| 2007/0073734 A1 * | 3/2007 | Doan et al. .................... 707/100 |
| 2009/0019015 A1 * | 1/2009 | Hijikata ............................ 707/3 |

FOREIGN PATENT DOCUMENTS

JP    2011-96255 A    5/2011

\* cited by examiner

*Primary Examiner* — Usmaan Saeed
*Assistant Examiner* — Raquel Perez-Arroyo
(74) *Attorney, Agent, or Firm* — Cantor Colburn LLP

(57) ABSTRACT

A keyword related to a user's interest is acquired. A keyword acquiring device including a tree storage unit that stores a keyword tree obtained by performing hierarchization according to the number of appearances and relevance in advance using a keyword associated with content as a node records a keyword associated with content previously selected by a user as a log, extracts a plurality of keywords based on a predetermined condition from a log corresponding to a certain user recorded in the log, extracts a partial tree including the extracted keywords from the keyword tree, and acquires a keyword in a node having no other lower node as a keyword related to the user's interest.

6 Claims, 15 Drawing Sheets

FIG. 2

| MOVING IMAGE ID | TAG |
|---|---|
| M1001 | TEAM OO, BASEBALL, SPORTS, SPECTATING, ERROR, LAUGH, UPSET |
| M1002 | MIRACLE, FINE PLAY, BASEBALL, SPORTS, LEGEND |
| M1003 | FREE KICK, SOCCER, SPORTS, IN VERIFICATION TARGET OF PHYSICS, MIRACLE, LEGEND, INTERNATIONAL MATCH |
| ⋮ | ⋮ |

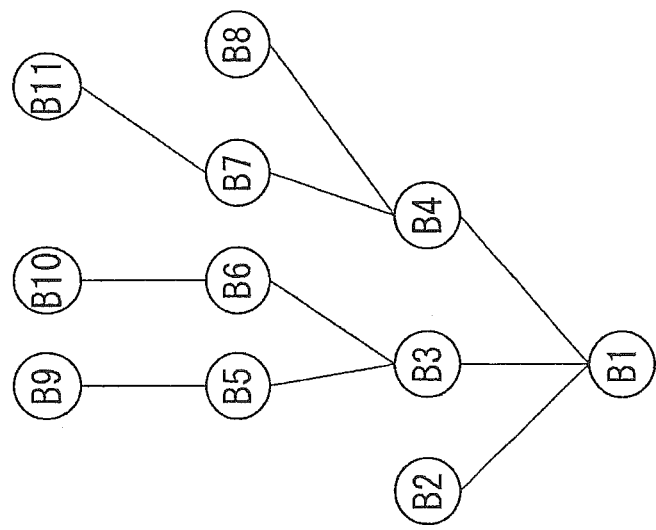
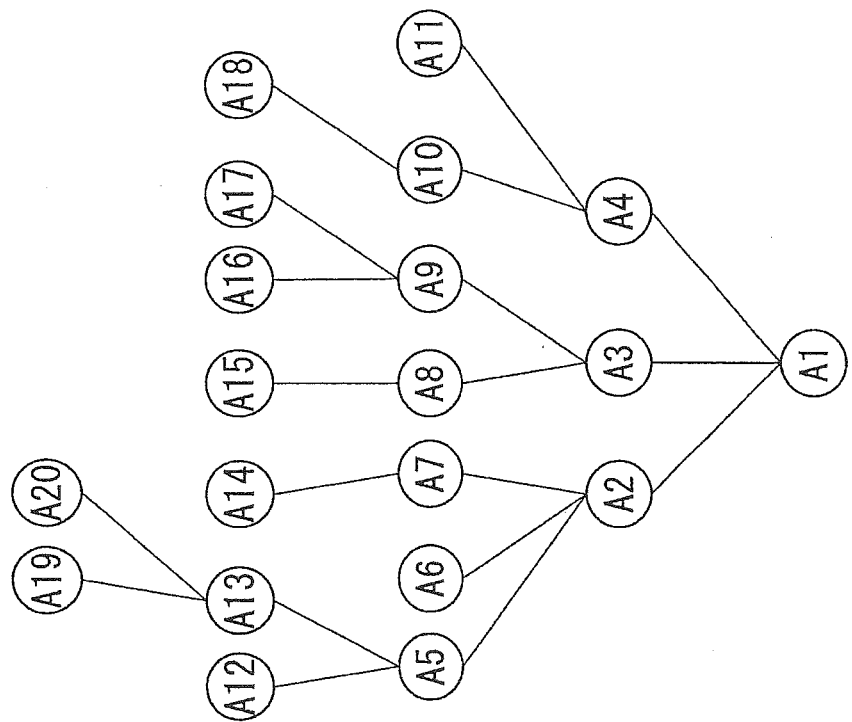
FIG. 3

FIG. 6

| TAG | COUNT NUMBER |
|---|---|
| A2 | 10 |
| A4 | 15 |
| A5 | 5 |
| A6 | 7 |
| A8 | 11 |
| A12 | 5 |
| A13 | 3 |
| A15 | 10 |
| B1 | 8 |
| B2 | 5 |
| B3 | 4 |
| B4 | 6 |
| B5 | 2 |
| B6 | 3 |
| B7 | 1 |
| B9 | 1 |
| B10 | 2 |
|  |  |

KEYWORD ACQUIRING DEVICE, CONTENT PROVIDING SYSTEM, KEYWORD ACQUIRING METHOD, A COMPUTER-READABLE RECORDING MEDIUM AND CONTENT PROVIDING METHOD

BACKGROUND OF THE INVENTION

1. Field of the Invention

The present invention relates to a technique of acquiring a keyword related to a user's interest.

Priority is claimed on Japanese Patent Application No. 2011-247694, filed Nov. 11, 2011, the contents of which are incorporated herein by reference.

2. Description of Related Art

In the past, techniques of recommending another product or another moving image to a user based on a product or a moving image selected by the user have been proposed. For example, JP 2011-096255 A discloses a technique of recommending to the user using collaborative filtering. The collaborative filtering has been used in various fields as a technique of recommending to the user. For example, in book purchase sites, based on a book accessed by the user, another book accessed by another person who has accessed the same book is recommended using collaborative filtering.

However, in the above-mentioned technique, a recommendation is performed under the assumption that the user who has accessed a certain book will also have an interest in another book accessed by another user who accessed the same book. However, actually, users have various preferences, and thus a recommendation made based on a browsing habit of another user is not necessarily in tune with the user's preference. For this reason, it is difficult for the technique according to the related art to improve the accuracy of recommendation, and an enormous amount of access logs are necessary to increase the accuracy. In addition, as a fundamental problem, it is difficult to acquire a keyword related to the user's interest. In other words, when it becomes possible to acquire a keyword related to the user's interest, it is possible to estimate a product, a moving image, or the like suitable for the user's interest.

SUMMARY OF THE INVENTION

In light of the foregoing, the present invention is directed to provide a technique capable of acquiring a keyword related to the user's interest.

According to an aspect of the present invention, there is provided a keyword acquiring device including a tree storage unit that stores a keyword tree obtained by performing hierarchization according to the number of appearances and relevance in advance using a keyword associated with content as a node, a log storage unit that records a keyword associated with content previously selected by a user as a log, a partial tree extracting unit that extracts a plurality of keywords based on a predetermined condition from a log corresponding to a certain user recorded in the log storage unit, and extracts a partial tree including the extracted keywords from the keyword tree, and a keyword acquiring unit that acquires a keyword in a node having no other lower node as a keyword related to the user's interest.

According to an aspect of the present invention, in the keyword acquiring device, the keyword acquiring unit sorts each node of the partial tree for every two or more nodes having the same upper node based on a count number representing the number of keywords recorded in the log storage unit, explores the partial tree in order starting from a partial tree which is large in a count number of a highest node, and acquires a predetermined number of keywords.

According to the present invention, there is provided a content providing system including a tree storage unit that stores a keyword tree obtained by performing hierarchization according to the number of appearances and relevance in advance using a keyword associated with content as a node, a log storage unit that records a keyword associated with content previously selected by a user as a log, a partial tree extracting unit that extracts a plurality of keywords based on a predetermined condition from a log corresponding to a certain user recorded in the log storage unit, and extracts a partial tree including the extracted keywords from the keyword tree, a keyword acquiring unit that acquires a keyword in a node having no other lower node as a keyword related to the user's interest, a keyword storage unit that stores content and a keyword in advance in association with each other, and a content providing unit that provides content corresponding to the keyword acquired by the keyword acquiring unit to the user.

According to the present invention, in the content providing system, the content providing unit receives a keyword selected by the user from a user terminal that outputs the keyword acquired by the keyword acquiring unit on a screen, and provides the content associated with the selected keyword in the keyword storage unit to the user.

According to the present invention, there is a provided a keyword acquiring method performed by a keyword acquiring device including a tree storage unit that stores a keyword tree obtained by performing hierarchization according to the number of appearances and relevance in advance using a keyword associated with content as a node, and the keyword acquiring method includes recording a keyword associated with content previously selected by a user as a log, extracting a plurality of keywords based on a predetermined condition from a log corresponding to a certain user recorded in the log, extracting a partial tree including the extracted keywords from the keyword tree, and acquiring a keyword in a node having no other lower node as a keyword related to the user's interest.

According to the present invention, there is a computer-readable recording medium in which a computer program is recorded, the computer program causes a computer, which includes a tree storage unit that stores a keyword tree obtained by performing hierarchization according to the number of appearances and relevance in advance using a keyword associated with content as a node, to execute recording a keyword associated with content previously selected by a user as a log, extracting a plurality of keywords based on a predetermined condition from a log corresponding to a certain user recorded in the log, extracting a partial tree including the extracted keywords from the keyword tree, and acquiring a keyword in a node having no other lower node as a keyword related to the user's interest.

According to the present invention, there is provided a content providing method performed by a content providing system including a tree storage unit that stores a keyword tree obtained by performing hierarchization according to the number of appearances and relevance in advance using a keyword associated with content as a node and a keyword storage unit that stores content and a keyword in advance in association with each other, and the content providing method includes recording a keyword associated with content previously selected by a user as a log, extracting a plurality of keywords based on a predetermined condition from a log corresponding to a certain user recorded in a log storage unit, extracting a partial tree including the extracted keywords from the keyword tree, acquiring a keyword in a node having no other lower node as a keyword related to the user's interest, and providing content corresponding to the keyword acquired in the acquiring of the keyword to the user.

According to the embodiments of the present invention, it is possible to acquire a keyword related to the user's interest.

BRIEF DESCRIPTION OF THE DRAWINGS

FIG. 2 is a diagram illustrating a concrete example of a tag table;

FIG. 3 is a diagram illustrating a concrete example of a tag tree;

FIG. 6 is a diagram illustrating a concrete example of each tag and a count number;

DETAILED DESCRIPTION OF THE INVENTION

Figure 1:
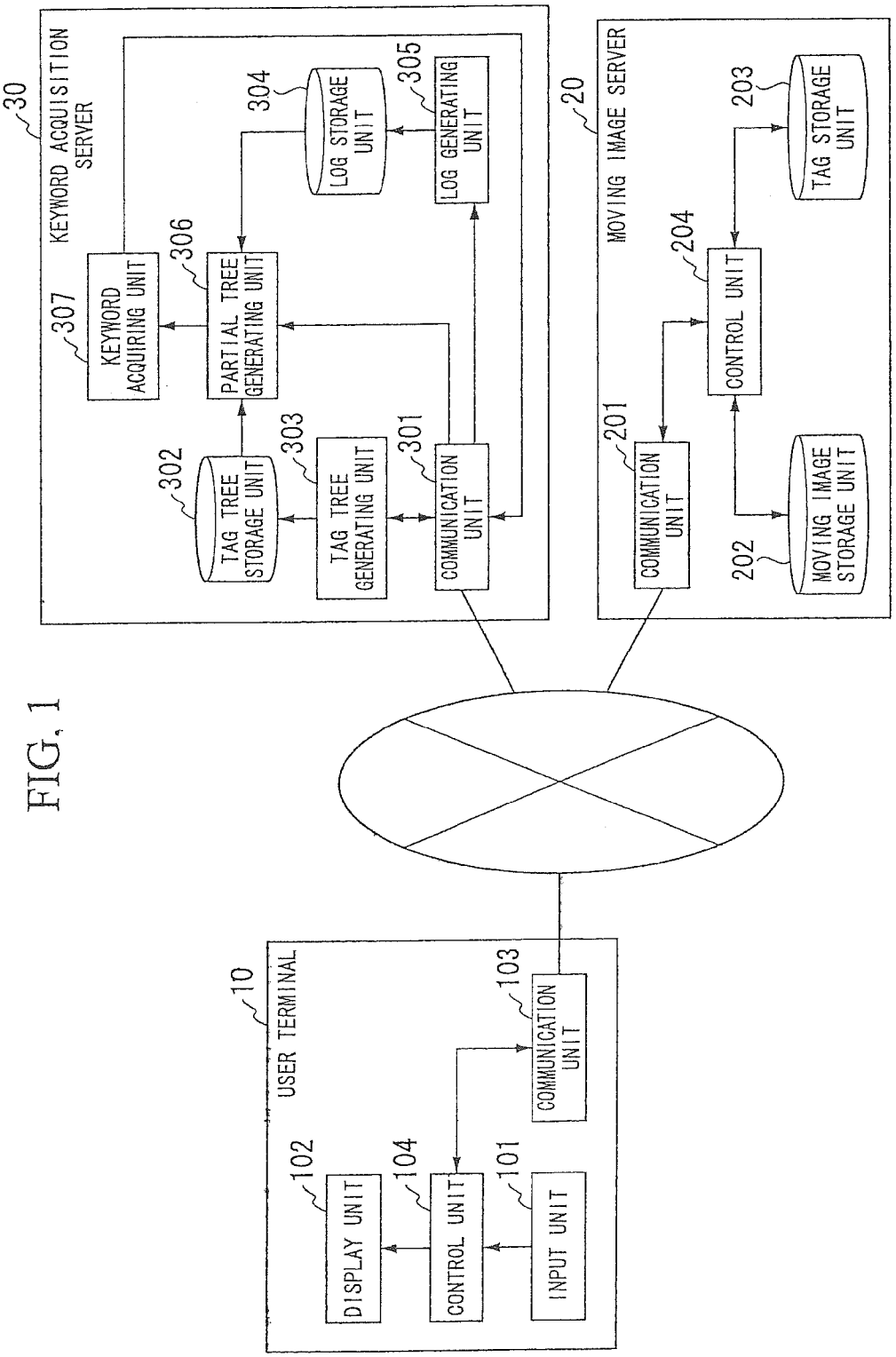
FIG. 1 is a system configuration diagram illustrating a system configuration of a content providing system 1.

FIG. 1 is a system configuration diagram illustrating a system configuration of a content providing system 1. The content providing system 1 includes a user terminal 10, a moving image server 20, and a keyword acquisition server 30 which are connected via a network to communicate one another. In the content providing system 1 illustrated in FIG. 1, moving image data is provided as a concrete example of content. Here, when other content is provided in the content providing system 1, the moving image server 20 is replaced with a server that provides other content.

The user terminal 10 is an information processing device such as a mobile phone, a smart phone, a personal computer (PC), a game machine, or a television receiver. The user terminal 10 receives moving image data from the moving image server 20 via a network and then reproduces the moving image data. The moving image server 20 is configured using an information processing device such as a mainframe, a workstation, or a PC. The moving image server 20 receives a moving image request from the user terminal 10, and transmits moving image data according to the moving image request to the user terminal 10. The keyword acquisition server 30 is configured using an information processing device such as a mainframe, a workstation, or a PC. The keyword acquisition server 30 acquires a keyword related to an interest of the user of the user terminal 10 based on moving image data previously requested by the user terminal 10.

Next, the respective devices will be described in detail.

The user terminal 10 includes a central processing unit (CPU), a memory, an auxiliary storage device, and the like which are connected via a bus, and executes a user terminal program. As the user terminal program is executed, the user terminal 10 functions as a device including an input unit 101, a display unit 102, a communication unit 103, and a control unit 104. All or some functions of the user terminal 10 may be implemented using hardware such as an application specific integrated circuit (ASIC), a programmable logic device (PLD), or a field programmable gate array (FPGA). The user terminal program may be in a computer readable recording medium. For example, a portable medium such as a flexible disk, a magneto-optical disc, a read only memory (ROM), a compact disc-read only memory (CD-ROM) or a storage device such as a hard disk installed in a computer system may be used as the computer readable recording medium. The user terminal program may be transmitted or received through an electric telecommunication line.

The input unit 101 is configured using an existing input device such as a keyboard, a pointing device (a mouse, a tablet, or the like), a button, and a touch panel. The input unit 101 is operated by the user when the user's instruction is input to the user terminal 10. The input unit 101 may be an interface that connects the input device to the user terminal 10. In this case, the input unit 101 inputs an input signal generated according to the user's input to the input device to the user terminal 10.

The display unit 102 is an image display device such as a cathode ray tube (CRT) display, a liquid crystal display (LCD), or an organic electro luminescence (EL) display. The display unit 102 displays a moving image play screen, a recommendation display screen, or a keyword display screen. The display unit 102 may be an interface that connects the image display device to the user terminal 10. In this case, the display unit 102 generates a video signal used to display the moving image play screen, the recommendation display screen, or the keyword display screen, and outputs the video signal to the image display device connected thereto.

The communication unit 103 is a communication device such as a network card. The communication unit 103 performs communication with the moving image server 20 or the moving image acquiring server 30 via a network N.

The control unit 104 generates the moving image p screen or the recommendation display screen, and outputs the moving image play screen or the recommendation display screen to the display unit 102. Specifically, the control unit 104 operates as follows. When the user selects moving image data through the input unit 101, the control unit 104 generates data (a moving image request) to request the selected moving image data. The moving image request includes a user ID and a moving image ID. The user ID is identification information representing the user of the user terminal 10. The moving image ID is identification information representing moving image data selected by the user. The control unit 104 transmits the generated moving image request to the moving image server 20. Upon receiving the moving image data according to the moving image request from the moving image server 20, the control unit 104 reproduces the moving image data, and outputs the moving image play screen to the display unit 102. The reproduced moving image data is displayed on the moving image play screen.

The moving image server 20 includes a CPU, a memory, an auxiliary storage device, and the like which are connected to one another via a bus, and executes a moving image server program. As the moving image server program is executed, the moving image server 20 functions as a device including a communication unit 201, a moving image storage unit 202, a tag storage unit 203, and a control unit 204. All or some functions of the moving image server 20 may be implemented using hardware such as an ASIC, a PLD, or an FPGA. The moving image server program may be in a computer readable recording medium. For example, a portable medium such as a flexible disk, a magneto-optical disc, a ROM, a CD-ROM or a storage device such as a hard disk installed in a computer system may be used as the computer readable recording medium. The moving image server program may be transmitted or received through an electric telecommunication line.

The communication unit 201 is a communication device such as a network card. The communication unit 201 performs communication with the user terminal 10 and the keyword acquisition server 30 via the network N.

The moving image storage unit 202 is configured using a storage device such as a magnetic hard disk device or a semiconductor memory device. The moving image storage unit 202 stores a plurality of pieces of moving image data.

The tag storage unit 203 is configured using a storage device such as a magnetic hard disk device or a semiconductor memory device. The tag storage unit 203 stores a tag table. FIG. 2 is a diagram illustrating a concrete example of a tag table. The tag table stores one or more tags for each moving image ID. The moving image ID is identification information of moving image data stored in the moving image storage unit 202. The tag is character string information representing a keyword related to moving image data.

Upon receiving the moving image request from the user terminal 10, the control unit 204 reads moving image data corresponding to the moving image ID included in the moving image request from the moving image storage unit 202. Then, the control unit 204 outputs the read moving image data to the user terminal 10. In addition, the control unit 204 reads a tag associated with the moving image ID included in the moving image request from the tag storage unit 203. Then, the control unit 204 transmits the read tag to the keyword acquisition server 30 together with the user ID and the moving image ID included in the moving image request.

Upon receiving a tag request from the keyword acquisition server 30, the control unit 204 transmits tag table information stored in the tag storage unit 203 to the keyword acquisition server 30.

The keyword acquisition server 30 includes a CPU, a memory, an auxiliary storage device, and the like which are connected to one another via a bus, and executes a keyword acquisition program. As the keyword acquisition program is executed, the keyword acquisition server 30 functions as a device including a communication unit 301, a tag tree storage unit 302, a tag tree generating unit 303, a log storage unit 304, a log generating unit 305, a partial tree generating unit 306, and a keyword acquiring unit 307. All or some functions of the keyword acquisition server 30 may be implemented using hardware such as an ASIC, a PLD, or an FPGA. The keyword acquisition program may be in a computer readable recording medium. For example, a portable medium such as a flexible disk, a magneto-optical disc, a ROM, a CD-ROM or a storage device such as a hard disk installed in a computer system may be used as the computer readable recording medium. The keyword acquisition program may be transmitted or received through an electric telecommunication line.

The communication unit 301 is a communication device such as a network card. The communication unit 301 performs communication with the user terminal 10 or the moving image server 20 via the network N.

The tag tree storage unit 302 is configured using a storage device such as a magnetic hard disk device or a semiconductor memory device. The tag tree storage unit 302 stores a tag tree generated by the tag tree generating unit 303.

The tag tree generating unit 303 generates a tag tree (a keyword tree) at a predetermined timing, and records the generated tag tree in the tag tree storage unit 302. For example, the predetermined timing may be a time which is fixed every day, may be a time when a predetermined amount of new moving image data is registered to the moving image server, or may be any other timing. A concrete process of a tag tree generating method is as follows. When a predetermined timing arrives, the tag tree generating unit 303 transmits a tag request to the moving image server 20. The tag tree generating unit 303 receives the tag table information from the moving image server 20, and generates the tag tree based on the tag table information.

FIG. 3 is a diagram illustrating a concrete example of a tag tree. The tag tree is data of a tree structure obtained by performing hierarchization according to the number of appearances and relevance using one tag associated with moving image data as one node. In the following description, terms such as a node A1 and a node A2 are used when a tree structure is described, whereas terms such as a tag A1 and a tag A2 are used when a tag associated with each node is described.

In FIG. 3, nodes (for example, A1 and B1) positioned in a lower portion are nodes of an upper layer, and nodes (for example, A19 and A20) positioned in an upper portion are nodes of a lower layer. In the tag tree configured with nodes A1 to A20, the node A1 is a highest node. The nodes A2, A3, and A4 are connected as nodes lower than the node A1. The tag tree has the structure illustrated in FIG. 3.

A method of generating the tag tree will be described. The number of appearances of a tag X1 in the tag table is represented by Nx1, and the number of appearances of a tag X2 is represented by Nx2. The number of appearances represents the number of times that a tag appears in the tag table, and for example, the number of moving images ID to which a corresponding tag is registered in the tag table may be used as the number of appearances. Here, when the tag X1 and the tag X2 satisfy both a condition (a condition 1) represented by Formula 1 and a condition (a condition 2) represented by Formula 2, the tag X1 and the tag X2 are connected to each other by a link in the tree structure, and the tag X1 becomes a node higher than the tag X2. In Formula 2, Th1 represents a threshold value.

$$Nx1 > Nx2 \qquad \text{(Formula 1)}$$

$$\frac{|Nx1 \cap Nx2|}{\min(|Nx1|, |Nx2|)} > Th1 \qquad \text{(Formula 2)}$$

The condition 1 is a condition that the number of appearances (an appearance frequency) of the tag X1 be larger than the number of appearances (an appearance frequency) of the tag X2. The condition 2 is a condition that a co-occurrence probability of the tag X1 and the tag X2 be the threshold value (Th1) or more.

The tag tree generating unit 303 determines whether or not a combination of all tags has satisfied both the condition 1 and the condition 2, and generates the tag tree.

The log storage unit 304 is configured using a storage device such as a magnetic hard disk device or a semiconductor memory device. The log storage unit 304 accumulates log information generated by the log generating unit 305.

The log generating unit 305 records a tag associated with moving image data previously selected by the user of the user terminal 10 in the log storage unit 304 as a log. For example, the log generating unit 305 records a log as follows. The log generating unit 305 receives a tag corresponding to moving image data selected by the user, a user ID of the user, and a moving image ID of the moving image data from the moving image server 20. The log generating unit 305 records the received tag, the user ID, and the moving image ID in the log storage unit 304 in association with one another. At this time, the log generating unit 305 determines whether or not the number of moving images ID recorded in association with the same user ID is a predetermined number or more. Here, when it is determined that the number of moving images ID recorded in association with the same user ID is the predetermined number or more, the log generating unit 305 discards the oldest log (a combination of the moving image ID, the user ID, and the tag), and records a new log (a combination of the moving image ID, the user ID, and the tag). However, when it is determined that the number of moving images ID recorded in association with the same user ID is less than the predetermined number, the log generating unit 305 records a new log without discarding an old log.

The partial tree generating unit 306 generates a partial tree based on the tag tree stored in the tag tree storage unit 302 and the log stored in the log storage unit 304. A timing (keyword acquisition timing) at which the partial tree generating unit 306 generates the partial tree can be any timing. The partial tree is data of a tree structure configured by cutting only a tag recorded as a log from the tag tree. Here, when a tag recorded as a log is cut, if a tag recorded as a log is presented on a layer higher or lower than the corresponding tag, the partial tree generating unit 306 cuts each node together with a link connecting both nodes.

Figure 4:
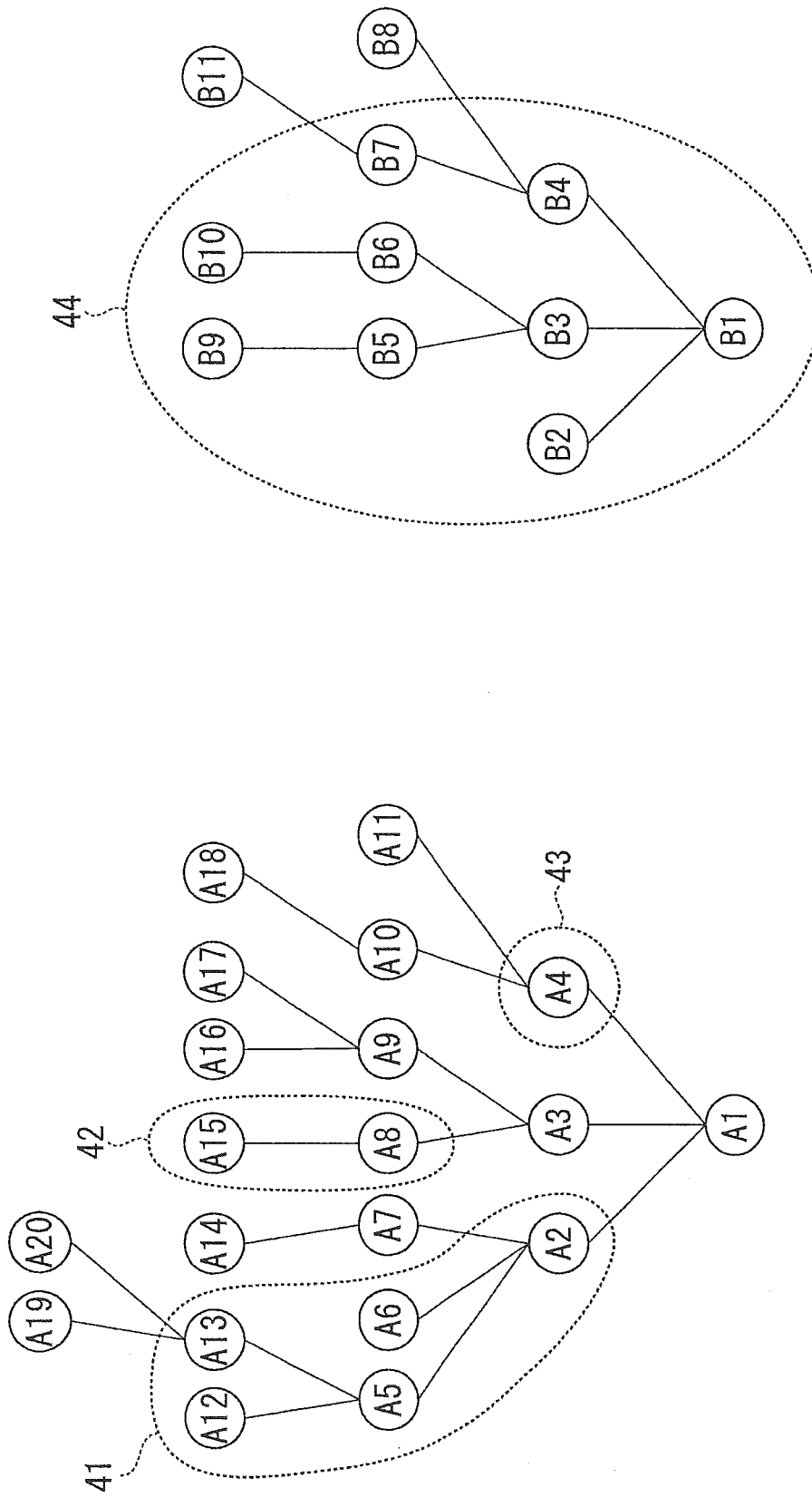
FIG. 4 is a diagram illustrating a concrete example of a partial tree.

FIG. 4 is a diagram illustrating a concrete example of a partial tree. Here, each of fields 41 to 44 surrounded by a dashed line (hereinafter referred to as "dashed fields") represents a partial tree. In the following, reference numerals 41 to 44 are used to represent a partial tree. The partial tree 41 includes tags A2, A5, A6, A12, and A13 as logs but does not include tags A1, A19, and A20 as logs and thus is a partial tree extracted by the partial tree generating unit 306. The partial tree 42 includes tags A8 and A15 as logs but does not include a tag A3 as a log and thus is a partial tree extracted by the partial tree generating unit 306. The partial tree 43 includes a tag A4 as a log but does not include tags A1, A10, and A11 as logs and thus is a partial tree extracted by the partial tree generating unit 306. The partial tree 44 includes tags B1 to B7, B9, and B10 as logs but does not include tags B8 and B11 as logs and thus is a partial tree extracted by the partial tree generating unit 306.

The partial tree generating unit 306 outputs the generated partial tree to the keyword acquiring unit 307. The keyword acquiring unit 307 acquires a keyword related to the user's interest corresponding to a log used by the partial tree generating unit 306 based on the partial tree generated by the partial tree generating unit 306. Next, a concrete process of the keyword acquiring unit 307 will be described.

Figure 5:
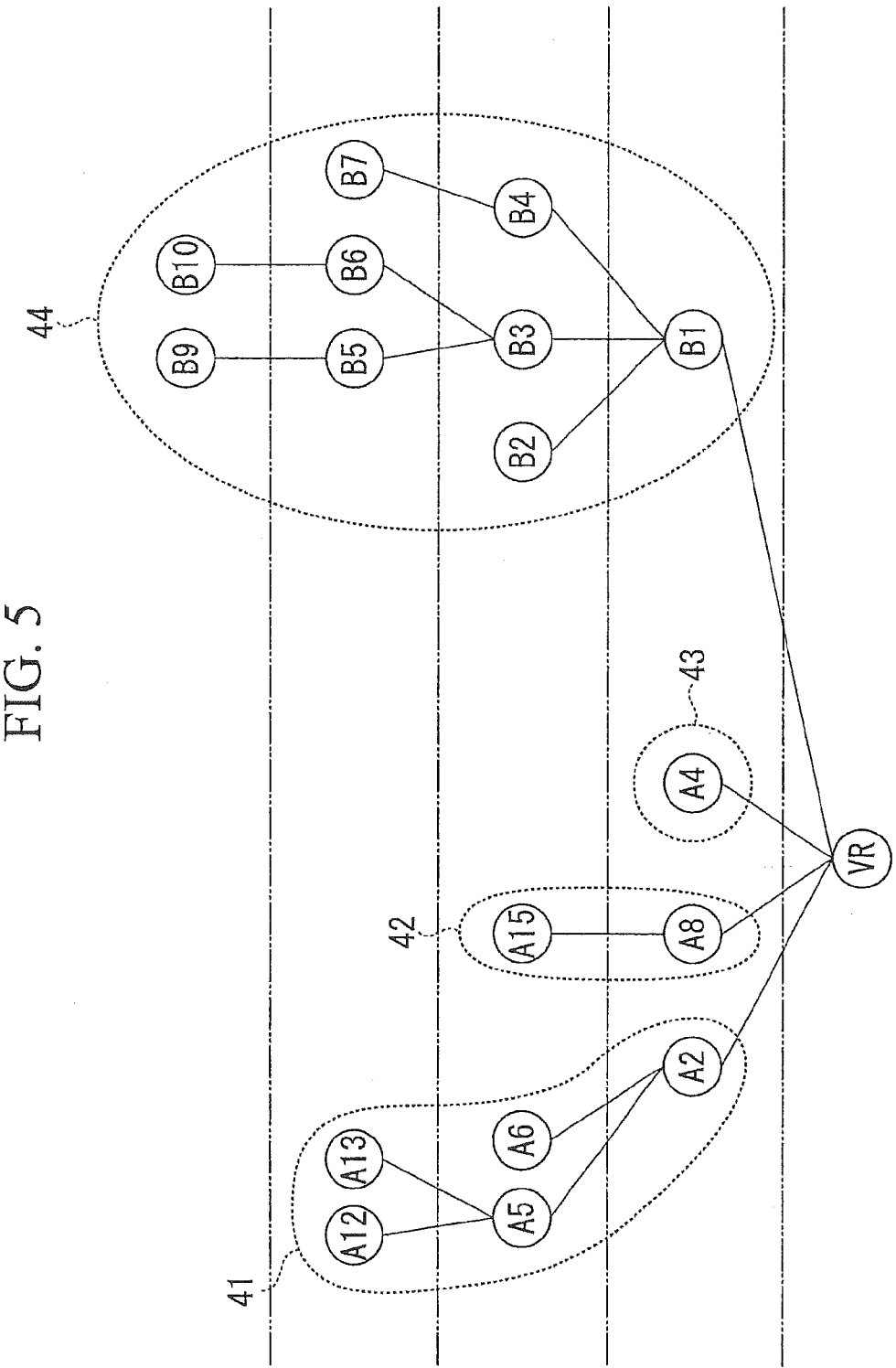
FIG. 5 is a diagram of a hierarchy of a partial tree.

FIG. 5 is a diagram of a hierarchy of a partial tree. As illustrated in FIG. 5, the keyword acquiring unit 307 places highest nodes of the partial trees 41 to 44 (A2, A8, A4, and B1) on the same layer, and places a root node VR as a node of a layer immediately higher than that of the highest nodes.

Next, the keyword acquiring unit 307 sorts the nodes of the partial tree in units of two or more nodes having the same host node based on a count number representing the number of tags in each node. The count number refers to a node representing the number of times that each tag appears in the user's log. FIG. 6 is a diagram illustrating a concrete example of each tag and a count number. For example, the fact that the count number of the tag A2 is 10 represents that the tag A2 in the user's log which is a processing target appears ten times (is associated with ten moving images ID).

Figure 7:
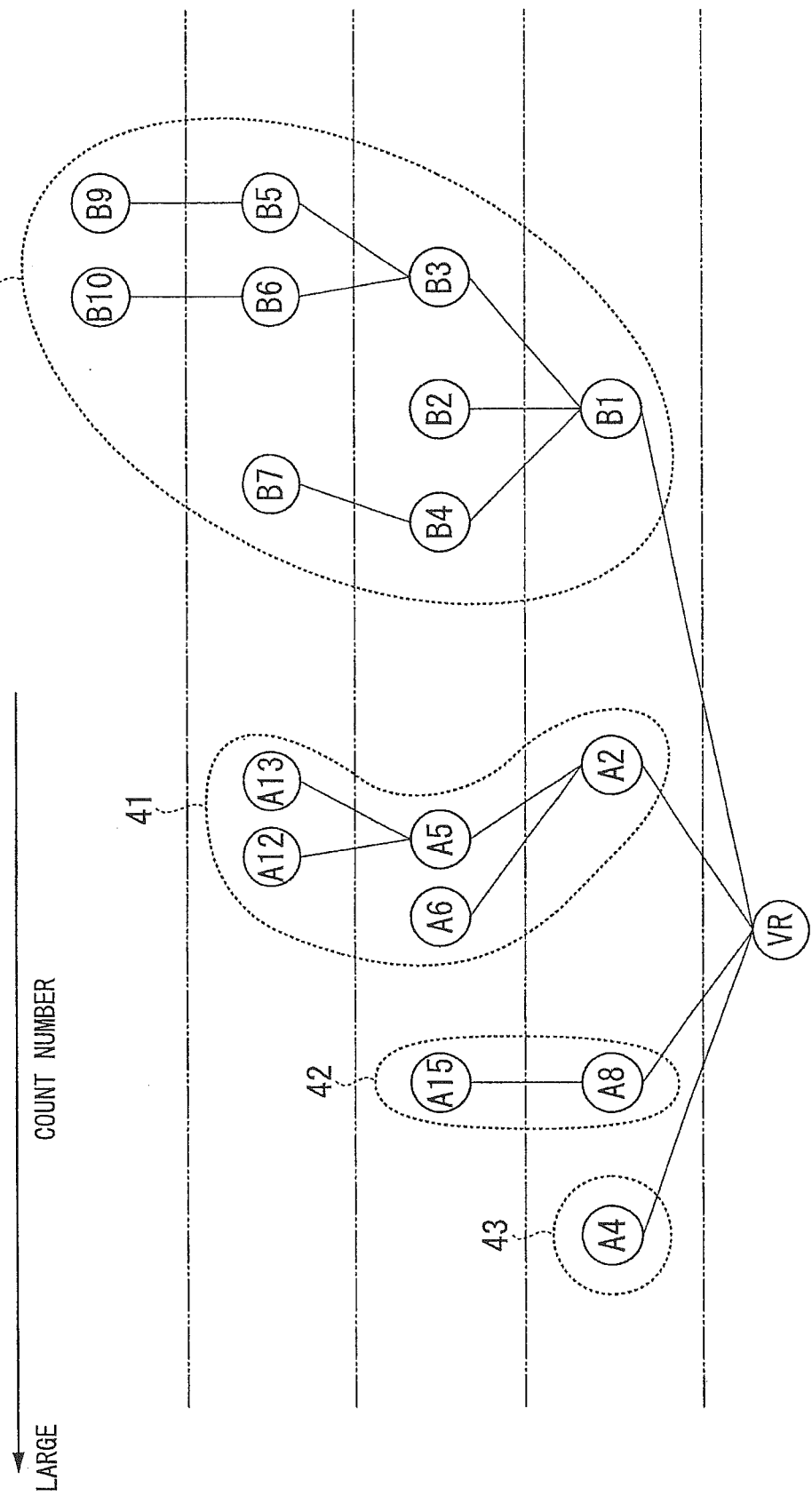
FIG. 7 is a diagram illustrating a sorting example of each node when the count number of FIG. 6 is given.

FIG. 7 is a diagram illustrating a sorting example of each node when the count number of FIG. 6 is given. The keyword acquiring unit 307 sorts each non-sorted partial tree illustrated in FIG. 5 based on the count number illustrated in FIG. 6 as illustrated in FIG. 7. In FIG. 7, in each of the nodes having the same host node, a node positioned at the left side is large in the count number, and a node positioned at the right side is small in the count number. For example, the description will be made using the highest nodes of the partial trees 41 to 44 as an example. The highest nodes of the partial trees 41 to 44 have the same host node (the root node VR). The count numbers of the highest nodes of the partial trees 41 to 44 are 10 (the node A2), 11 (the node A8), 15 (the node A4), and 8 (the node B1), respectively. Here, when the nodes are sorted in descending order of the counter numbers, 15 (the node A4), 11 (the node A8), 10 (the node A2), and 8 (the node B1) are obtained. Thus, after sorting, the partial trees 41 to 44 are arranged in order of the partial trees 43, 42, 41, and 44.

As another concrete example, the description will be made in connection with the nodes A5 and A6 of the partial tree 41. The nodes A5 and A6 have the same host node (the node A2). Here, the count number of the node A5 is 5, and the count number of the node A6 is 7. Thus, when the two nodes are sorted, the nodes A6 and the node A5 are arranged in order as illustrated in FIG. 7. The nodes A15 and B2 to B4 belonging to another partial tree are present on the same layer as the nodes A5 and A6. However, the nodes A15 and B2 to B4 have different upper nodes from the nodes A5 and A6. In other words, the upper node of the node A5 and the node A6 is the node A2, whereas the upper node of the node A15 is the node A8, and the upper node of the nodes B2 to B4 are the node B1. That is, the nodes A15 and B2 to B4 have different upper nodes from the nodes A5 and A6. Thus, the keyword acquiring unit 307 performs sorting between the two nodes in connection with the nodes A5 and A6. In other words, the keyword acquiring unit 307 does not perform sorting between the nodes A5 and A6 and either of the node A15 and the nodes B2 to B4. This is similarly applied to other nodes.

Figure 8:
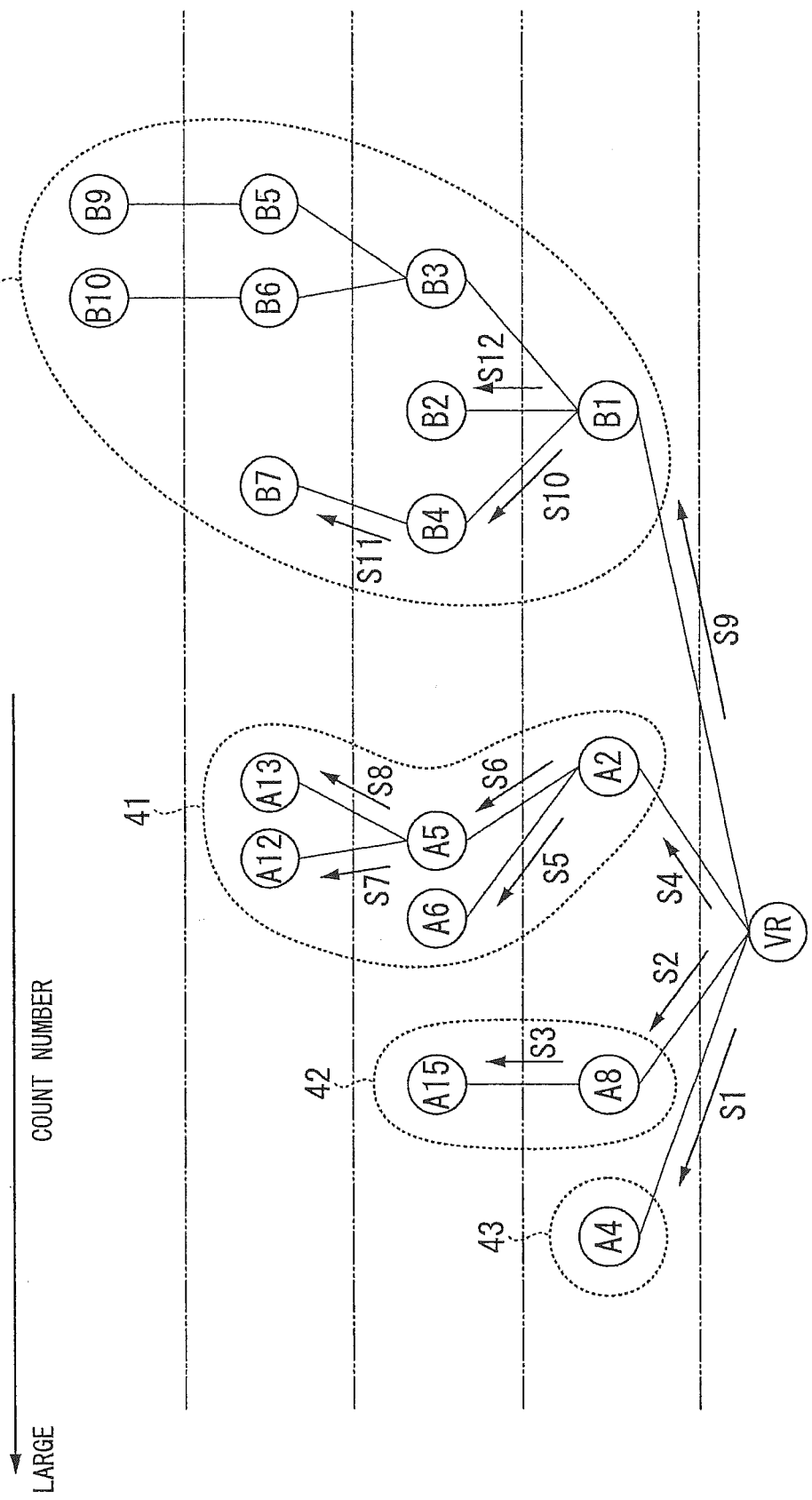
FIG. 8 is a diagram illustrating a concrete example of an exploration order of a keyword acquiring unit 307.

FIG. 8 is a diagram illustrating a concrete example of an exploration order of the keyword acquiring unit 307. The keyword acquiring unit 307 explores the partial tree in descending order of the count numbers of the highest nodes and acquires a predetermined number of tags. In the exploration, the keyword acquiring unit 307 acquires a tag in a node having no lower node as a keyword related to the user's interest.

A concrete example of FIG. 8 will be described below. First, the keyword acquiring unit 307 explores the partial tree 43 which is highest in the count number of the highest node starting from the root node VR (S1). The keyword acquiring unit 307 determines whether or not the arrived node A4 has a lower node. The node A4 does not have a lower node. In this case, the keyword acquiring unit 307 acquires the tag of the node A4 as the keyword related to the user's interest. At this time, the keyword acquiring unit 307 updates the number of acquired keywords to one (1). Then, the keyword acquiring unit 307 determines whether or not the number of acquired keywords is larger than a predetermined number. In the present embodiment, the predetermined number of keywords is set to seven (7). Since the number of acquired keywords is not larger than the predetermined number as this point in time, the keyword acquiring unit 307 keeps exploring.

Since all nodes of the partial tree 43 have been explored, the keyword acquiring unit 307 starts to explore the next partial tree 42 (S2). First, the keyword acquiring unit 307 determines whether or not the arrived node A8 has a lower node. The node A15 is present as a lower node of the node A8. Thus, the keyword acquiring unit 307 keeps exploring without acquiring the tag A8 (S3). The keyword acquiring unit 307 determines whether or not the subsequently arrived node A15 has a lower node. The node A15 has no lower node. In this case, the keyword acquiring unit 307 acquires the tag of the node A15 as the keyword related to the user's interest. At this time, the keyword acquiring unit 307 updates the number of acquired keywords to two (2). Then, the keyword acquiring unit 307 determines whether or not the number of acquired keywords is larger than the predetermined number. Since the number of acquired keywords is not larger than the predetermined number at this point in time, the keyword acquiring unit 307 keeps exploring.

Since all nodes of the partial tree 42 have been explored, the keyword acquiring unit 307 starts to explore the next partial tree 41 (S4). Thereafter, the keyword acquiring unit 307 explores the partial tree 42 in order (S5 to S8), and acquires the tags (the tag A6, the tag A12, and the tag A13) having no lower node as the keyword. Since the number of acquired keywords is five (5) and is not larger than the predetermined number at this point in time, the keyword acquiring unit 307 keeps exploring.

Since all nodes of the partial tree 41 have been explored, the keyword acquiring unit 307 starts to explore the next partial tree 44 (S9). The keyword acquiring unit 307 performs the exploration of S10 to S12 and acquires the tags (the tags B7 and B2) having no lower node as the keyword. At this point in time, the number of acquired keywords is seven (7) and is equal to the predetermined number. In other words, when the exploration is continuously performed and then the keyword is newly acquired, the number of acquired keywords exceeds the predetermined number. Thus, the keyword acquiring unit 307 ends the exploration at this point in time.

Figure 9:
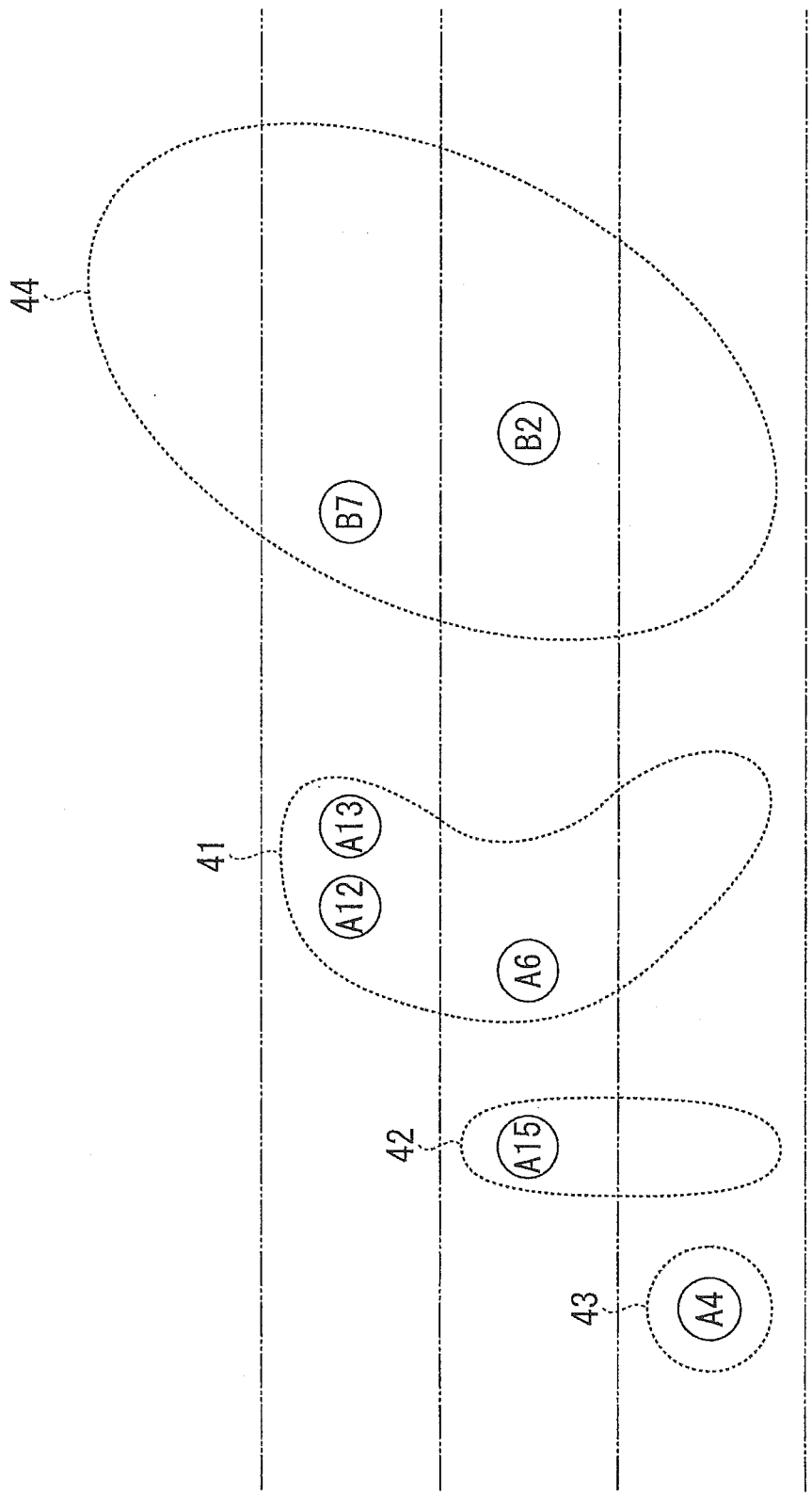
FIG. 9 is a diagram illustrating only tags acquired by the keyword acquiring unit 307.

FIG. 9 is a diagram illustrating the tags acquired by the keyword acquiring unit 307. The tags illustrated in FIG. 9 are acquired as the keyword related to the user's interest through the keyword acquiring unit 307. Next, a method of using the keyword acquired by the keyword acquiring unit 307 will be described using several concrete examples.

[Selection of Keyword]

Figure 10:
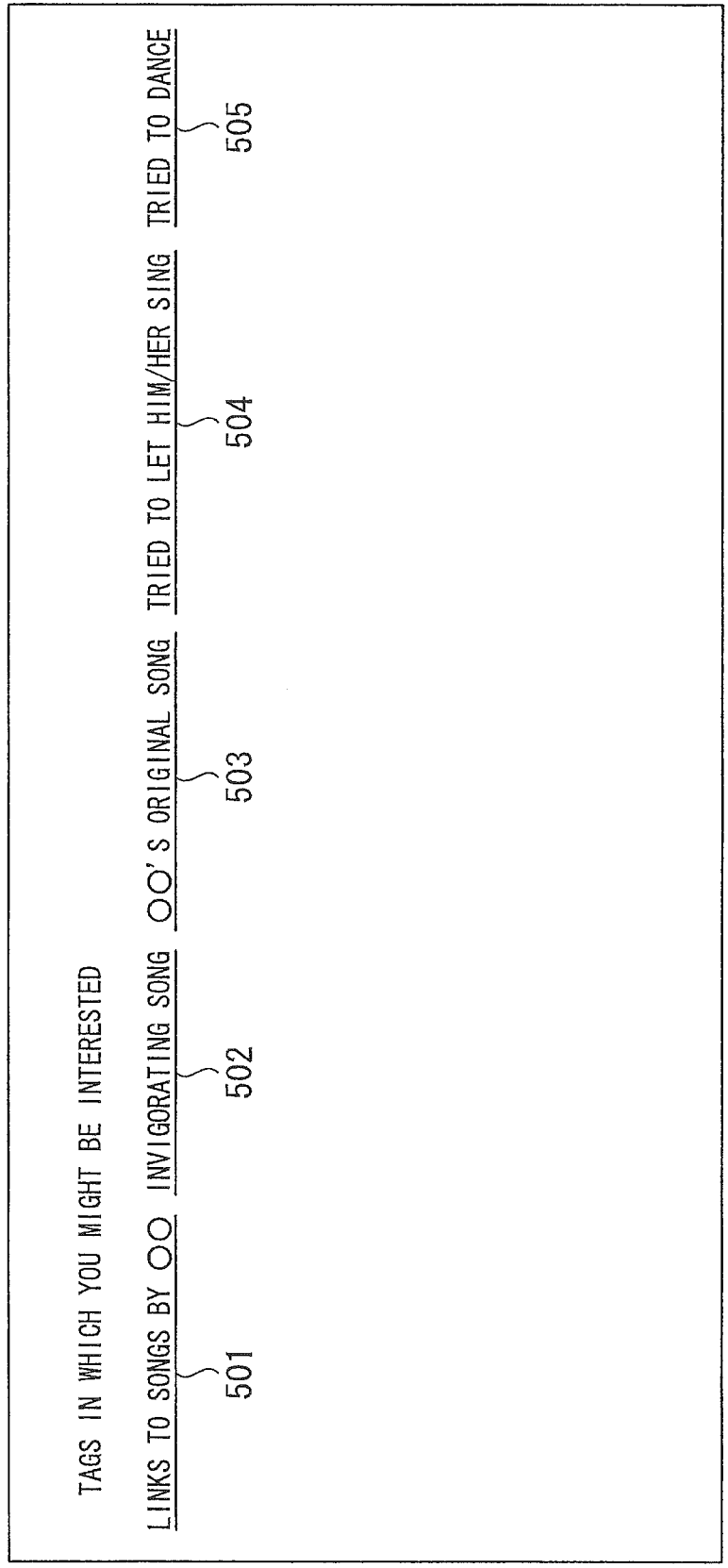
FIG. 10 is a diagram illustrating a concrete example of a keyword display screen.

The keyword acquiring unit 307 transmits the acquired keyword to the user terminal 10 of the user corresponding to the user ID. Upon receiving the keyword from the keyword acquisition server 30, the control unit 104 of the user terminal 10 outputs the keyword display screen to the display unit 102. FIG. 10 is a diagram illustrating a concrete example of the keyword display screen. One or more keywords selected by the keyword acquisition server 30 are displayed on the keyword display screen as a selection candidate.

In the concrete example of FIG. 10, five keywords acquired by the keyword acquiring unit 307 are listed on the keyword display screen together with a character string "tags in which you might be interested." Specifically, a keyword 501 "OO famous song link," a keyword 502 "invigorating song," a keyword 503 "OO's original song," a keyword 504 "tried to let him/her sing," and a keyword 505 "tried to dance" are arranged in a line at predetermined intervals together with underlines as selection candidates. The number of keywords displayed on the keyword display screen, an arrangement method thereof, and the like are not limited to the example of FIG. 10.

Here, when the user operates the input unit 101 and selects a keyword from among the selection candidates, the control unit 104 generates a keyword request of the selected keyword, and then transmits the keyword request to the moving image server 20. The keyword request includes a user ID and a keyword.

Upon receiving the keyword request from the user terminal 10, the control unit 204 of the moving image server 20 selects one or more pieces of moving image data based on the tag table and the keyword. For example, the control unit 204 may select moving image data associated with a tag matching the received keyword. For example, the control unit 204 may select moving image data associated with a predetermined number or more of tags matching the received keyword. The control unit 204 transmits the selected moving image data to the user terminal 10 of the user corresponding to the user ID. The control unit 104 of the user terminal 10 reproduces the received moving image data.

[Recommendation of Moving Image]

The keyword acquiring unit 307 transmits the acquired keyword to the moving image server 20 associated with the user ID. Upon receiving the keyword and the user ID from the keyword acquisition server 30, the control unit 204 of the moving image server 20 selects one or more pieces of moving image data based on the tag table and the keyword. For example, the control unit 204 may select moving image data associated with a tag matching the received keyword. For example, the control unit 204 may select moving image data associated with a predetermined number or more of tags matching the received keyword. The control unit 204 generates data (recommendation data) to introduce the selected moving image data to the user. Then, the control unit 204 transmits the recommendation data to the user terminal 10 of the user corresponding to the user ID.

Figure 11:
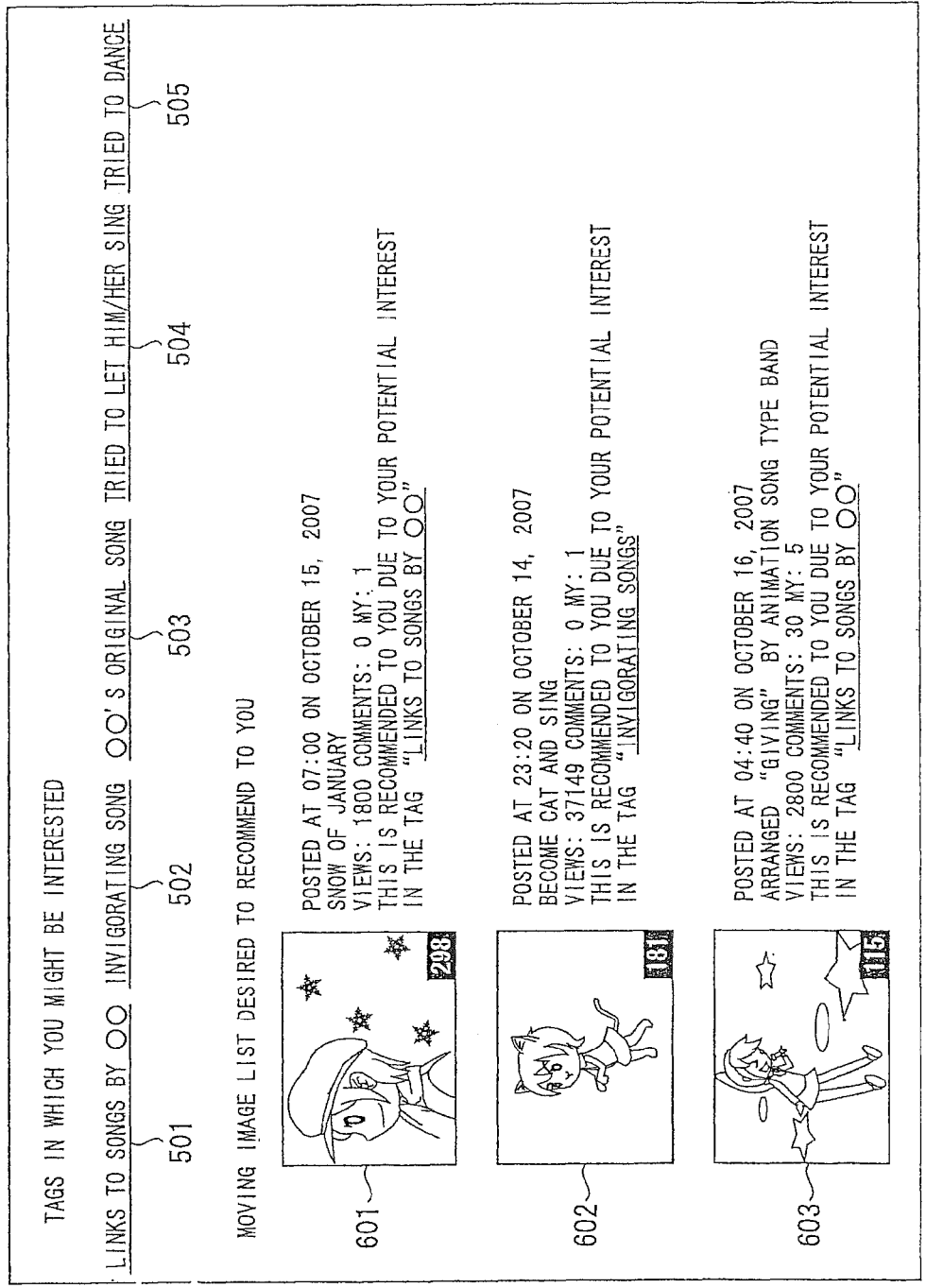
FIG. 11 is a diagram illustrating a concrete example of a recommendation display screen.

Upon receiving the recommendation data from the moving image server 20, the control unit 104 of the user terminal 10 outputs the recommendation display screen to the display unit 102. FIG. 11 is a diagram illustrating a concrete example of the recommendation display screen. One or more pieces of moving image data selected by the moving image server 20 and one or more keywords acquired by the keyword acquisition server 30 are displayed on the recommendation display screen as selection candidates.

In the concrete example of FIG. 11, five keywords acquired by the keyword acquiring unit 307 are listed on the recommendation display screen together with a character string "tags in which you might be interested." In addition, introduction information 601 to 603 of the moving image data selected by the moving image server 20 is displayed on the recommendation display screen together with a character string "moving image list recommended to you." Listing of keywords has been described above with reference to FIG. 10, and thus a description thereof will not be repeated. A display of "moving image list recommended to you" will be concretely described.

The introduction information includes information related to moving image data. For example, a thumbnail image of moving image data, a posting date and time, a title of moving image data, the number of play times of moving image data, the number of comments posted on moving image data, the number of times that moving image data is registered to a person's list, a keyword used to select moving image data, and the like are included in the introduction information.

The introduction information will be described using the introduction information 601 as an example. A thumbnail image is displayed on the leftmost side. The remaining introduction information is displayed on the right side of the thumbnail image as text. Text such as "posted at 07:00 on Oct. 15, 2007" is displayed as the posting date and time. Text such as "snow of January" is displayed as a title of moving image data. Text such as "VIEWS: 1800" is displayed as the number of play times of moving image data. Text such as "comments: 0" is displayed as the number of comments posted on moving image data. Text such as "my list: 1" is displayed as the number of times that moving image data is registered to a person's list. A text such as "this is recommended to you based on your potential interest in the tag "links for songs by OO" is displayed as a keyword used to select moving image data. An underline is attached to a character string such as "links for songs by OO." A character string with an underline attached thereto represents that a corresponding character string is a keyword acquired by the keyword acquisition server 30. For example, a keyword such as "links for famous songs by OO" is displayed on a screen upper portion as the keyword 501. The number of pieces of the introduction information displayed on the recommendation display screen, an arrangement thereof, and the like are not limited to the example of FIG. 11.

Here, when the user operates the input unit 101 and selects moving image data from among the selection candidates, the control unit 104 generates the moving image request of the generated moving image data, and transmits the moving image request to the moving image server 20.

Upon receiving the moving image request from the user terminal 10, the control unit 204 of the moving image server 20 transmits moving image data according to the moving image request to the user terminal as described above. The control unit 104 of the user terminal 10 reproduces the received moving image data.

Figure 12:
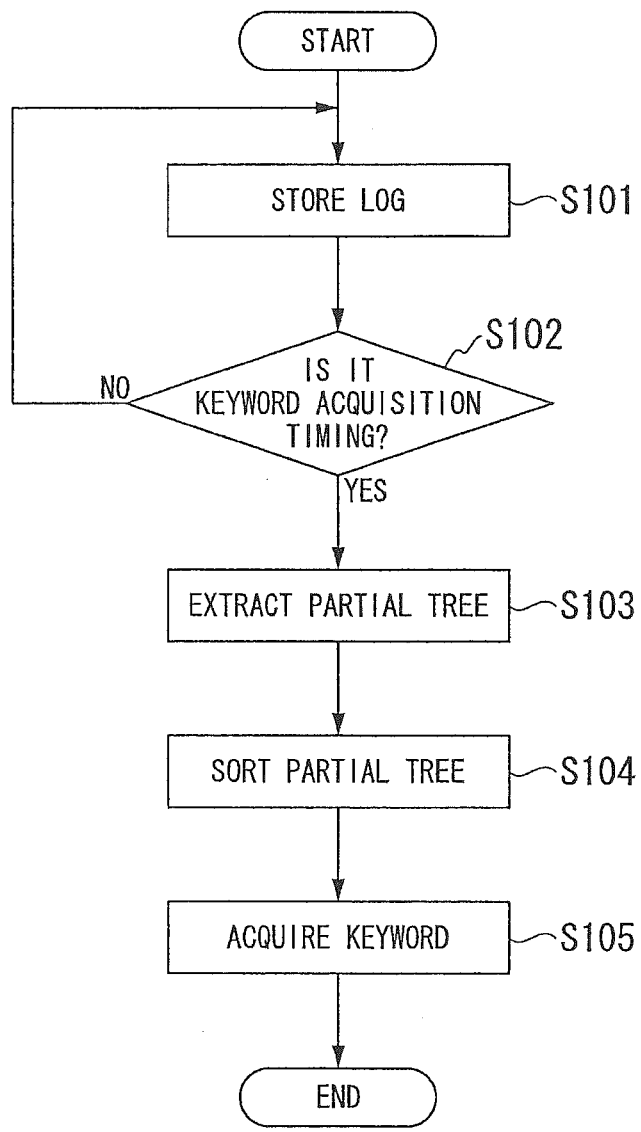
FIG. 12 is a flowchart illustrating the flow of an operation of a keyword acquisition server 30.
Figure 13:
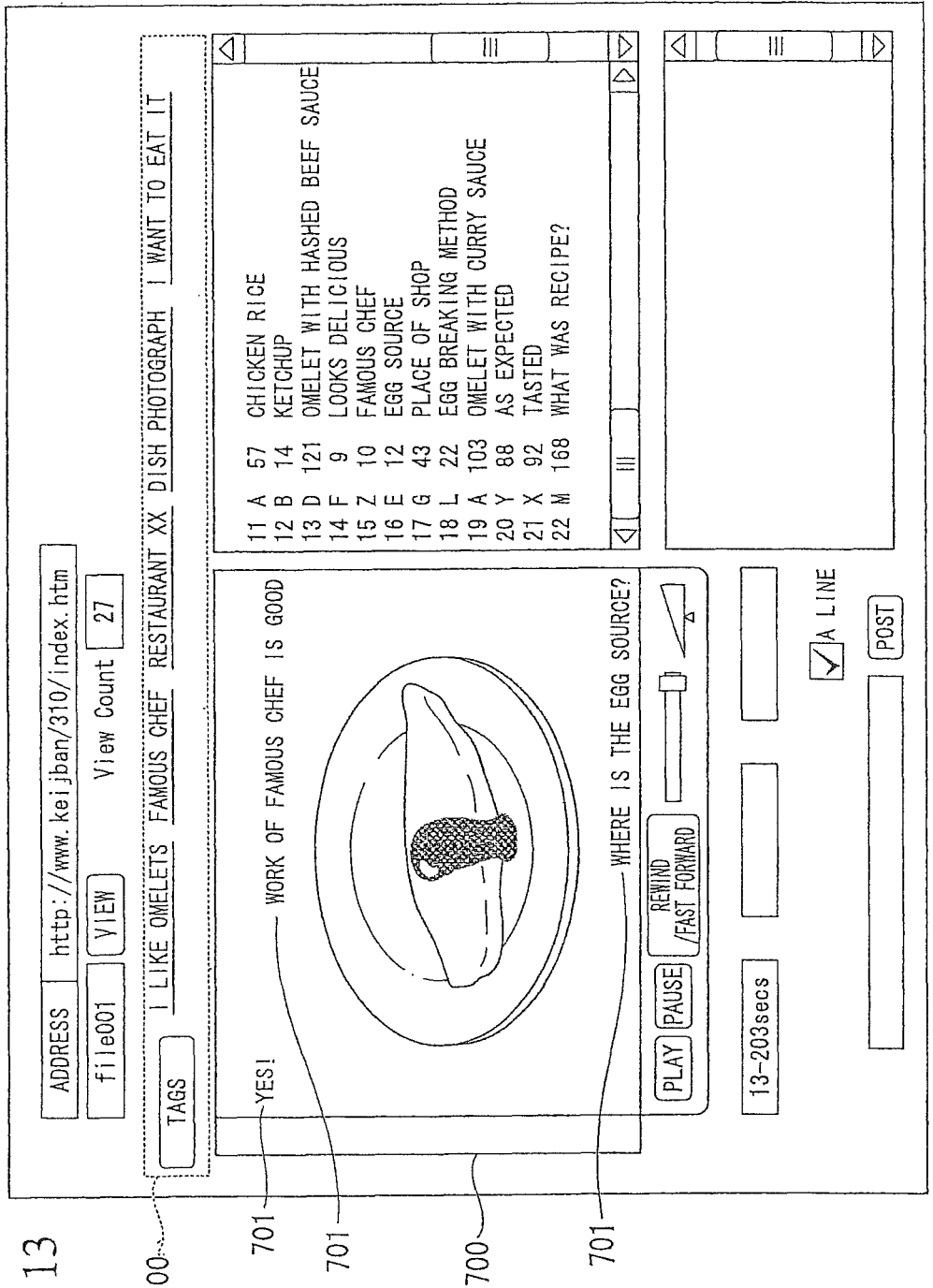
FIG. 13 is a diagram illustrating a concrete example of a moving image play screen.

FIG. 12 is a flowchart illustrating the flow of an operation of the keyword acquisition server 30. As pre-processing of the process illustrated in FIG. 12, the tag tree generating unit 303 generates and records a tag tree at a predetermined timing. Upon receiving a tag corresponding to moving image data selected by the user, the user ID of the user, and the moving image ID of the moving image data, the log generating unit 305 generates a log based on the received information, and records the log in the log storage unit 304 (step S101). At this time, the moving image data selected by the user and the tag associated with the moving image data are transmitted to the user terminal 10 through the moving image server 20 and then displayed on the user terminal 10. FIG. 13 is a diagram illustrating a concrete example of the moving image play screen. The moving image play screen includes a tag display field 600 to display a tag and a moving image play field 700 to reproduce a moving image. A tag associated with the moving image data reproduced in the moving image play field 700 is displayed on the tag display field 600. The moving image data selected by the user is reproduced on the moving image play field 700. In addition, a comment 701 posted on moving image data which is being reproduced is displayed on the moving image play field 700.

The description of the process of the keyword acquisition server 30 will continue. After the log is recorded in the log storage unit 304, the process of S101 is repeatedly executed until a keyword acquisition timing arrives. When the keyword acquisition timing arrives (Yes in step S102), the partial tree generating unit 306 generates the partial tree (step S103). Next, the keyword acquiring unit 307 performs the sorting process on the partial tree (step S104). Then, the keyword acquiring unit 307 acquires a predetermined number of keywords based on the sorted partial tree (step S105).

In the keyword acquisition server 30 having the above-described configuration, a tag tree is generated in advance based on the number of appearances and the relevance. Then, a partial tree including a tag corresponding to content (moving image data) previously selected by the user is generated. Then, a node having no lower node is acquired as the keyword related to the user's interest from among nodes configuring the partial tree. As described above, a keyword is acquired based on a log of the user rather than a log selected by another person, and thus the keyword related to the user's interest can be acquired with a high degree of accuracy.

<Modified Embodiment>

The keyword acquiring unit 307 may acquire each node having no lower node as the keyword related to the user's interest without performing the sorting process on the partial trees.

(Condition 2)

The condition 2 used when the tag tree generating unit 303 generates the tag tree is not necessarily limited to the condition expressed by Formula 2. The condition 2 may be a condition expressed by any other formula as far as the co-occurrence probability is a threshold value or more. For example, the condition 2 may be a condition expressed by the following Formula 3:

$$\frac{|Nx1 \cap Nx2|}{|Nx2|} > Th2 \quad \text{(Formula 3)}$$

In Formula 3, Th2 represents a threshold value.

(Weighting)

The keyword acquiring unit 307 may perform weighting on a plurality of acquired keywords. For example, the keyword acquiring unit 307 may perform weighting by the following process.

First, the keyword acquiring unit 307 divides the count number of the highest node by the number of nodes acquired in the partial tree for each of the partial trees 41 to 44. Then, the keyword acquiring unit 307 divides a value obtained by the division by the sum of the counter numbers of the highest nodes of all the partial trees 41 to 44. The keyword acquiring unit 307 applies a value obtained by the division to each node (keyword) acquired in each of the partial trees 41 to 44 as a weight.

The keyword acquiring unit 307 may decide a weight of each keyword by any calculation as long as the calculation is performed based on a count number.

(Selection of Moving Image Data According to Weighting)

Here, when the keyword acquiring unit 307 performs weighting on each keyword, the control unit 204 of the moving image server 20 may generate recommendation data as follows. First, the control unit 204 allocates a keyword to each of a predetermined number of recommendation limits. At this time, for example, the control unit 204 performs the allocation according to weighting of each keyword. More specifically, the control unit 204 allocates a keyword having a large weight to a large number of recommendation limits, and a keyword having a small weight to a small number of recommendation limits. For example, when a predetermined number is 10, weights of keywords A, B, and C are 0.5, 0.3, and 0.2, respectively, the keyword A is allocated to five recommendation limits, the keyword B is allocated to three recommendation limits, and the keyword C is allocated to two recommendation limits.

Next, the control unit 204 selects moving image data associated with a tag matching a keyword by the predetermined number of the recommendation limits for each keyword. For example, the control unit 204 selects ten pieces of moving image data associated with a tag matching the keyword A, selects ten pieces of moving image data associated with a tag matching the keyword B, and selects ten pieces of moving image data associated with a tag matching the keyword C.

Next, the control unit 204 randomly allocates one piece of moving image data among the moving image data selected on the allocated key to each recommendation limit. Through this process, moving image data is allocated to each of the predetermined number of recommendation limits. The control unit 204 generates recommendation data based on the allocation result, and transmits the recommendation data to the user terminal 10. For example, when the recommendation data displayed on the screen illustrated in FIG. 11 is generated, three recommendation limits are generated. In other words, the number of pieces of introduction information displayed on the recommendation display screen corresponds to the number of recommendation limits.

(Score of Moving Image Data)

The control unit 204 may perform scoring on each piece of moving image data. For example, the score is calculated as follows.

The control unit 204 acquires the number of users (the number of lists) who have registered each piece of moving image data to their list. The list is a bookmark function, that is, a function by which moving image data preferred by the user can be registered as a favorite. By registering moving image data as a favorite, the user can easily access favorite moving image data from a site dedicated to the user or the like. When the user operates the user terminal 10 and registers moving image data as a favorite, the control unit 104 of the user terminal 10 transmits the moving image ID of the moving image registered as a favorite and the user ID to the moving image server 20. The control unit 204 of the moving image server 20 registers the received moving image ID and the user ID to a favorite table in association with each other. The control unit 204 acquires the number of lists of each moving image data with reference to the favorite table.

Further, the control unit 204 acquires a time (elapsed time since posting) that has elapsed after each piece of moving image data is registered in the moving image server 20. For example, the control unit 204 may register a date and time when moving image data is registered to the moving image storage unit 202 and then can acquire the elapsed time since posting of each piece of moving image data.

The control unit 204 calculates the list/elapsed time since posting as a score for each piece of moving image data. The control unit 204 selects moving image data in descending order of the scores. For example, as described above, when moving image data corresponding to a predetermined number of recommendation limits is selected, the control unit 204 selects moving image data corresponding to the predetermined number from among the moving image data associated with the tag matching each keyword in descending order of scores.

(Partial Tree Exploring Method)

Figure 14:
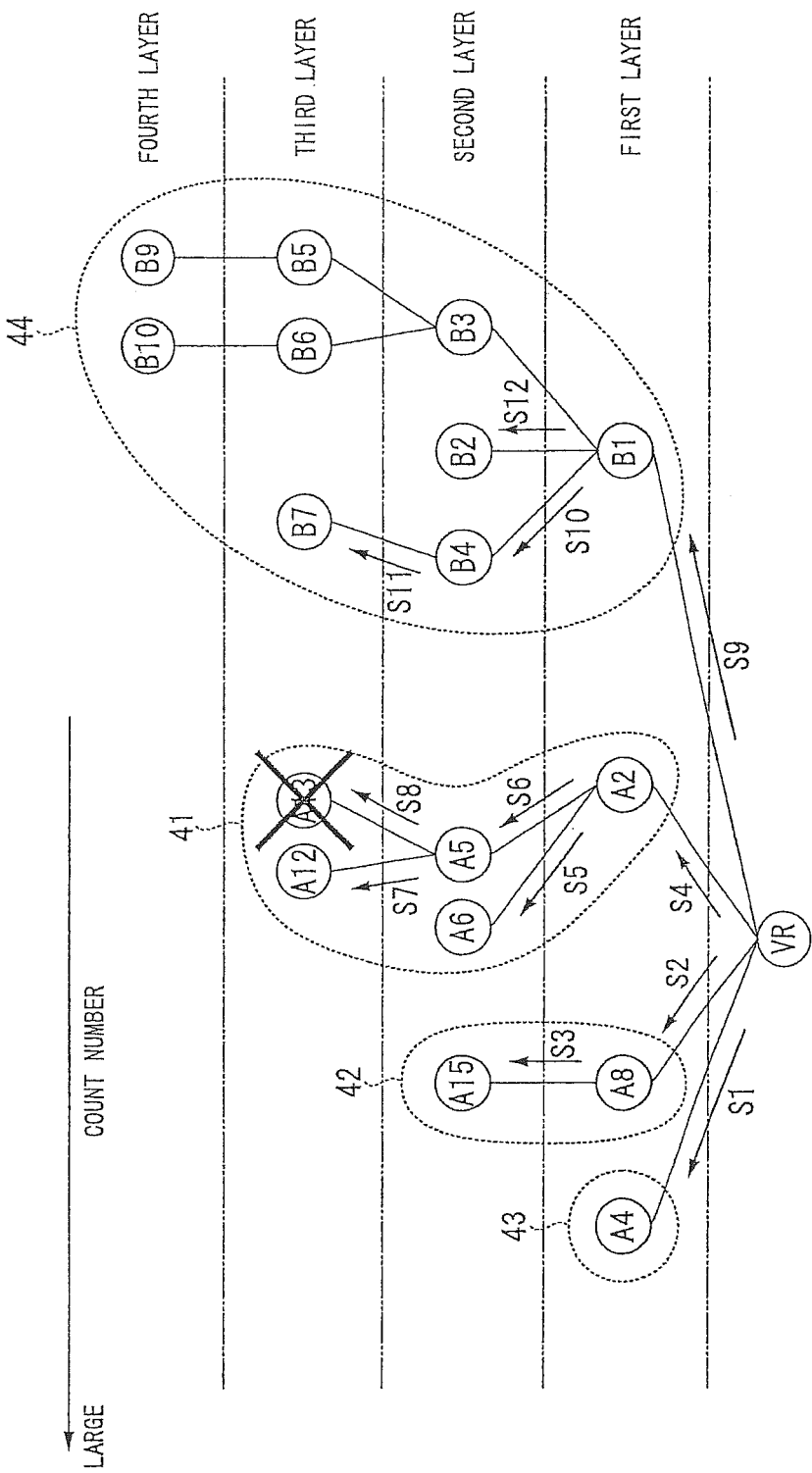
FIG. 14 is a diagram illustrating a first modified example of a method by which a keyword acquiring unit explores a partial tree.

A method by which the keyword acquiring unit 307 explores the partial tree is not necessarily limited to the above example. FIG. 14 is a diagram illustrating a first modified example of the method by which the keyword acquiring unit 307 explores the partial tree. The number of keywords acquired in one layer of each partial tree may be limited to a predetermined number. In the example of FIG. 14, the number of keywords acquired in one layer of the partial tree is limited to one (1). The difference between the process of FIG. 14 and the process of FIG. 8 will be described below.

The keyword acquiring unit 307 explores the partial tree 41, arrives at the node A12 (S7), and then determines whether or not another node lower than the arrived node A12 is present. The node A12 has no lower node. Here, the keyword acquiring unit 307 updates the number of keywords acquired in a third layer of the partial tree 41 from zero (0) to one (1). The keyword acquiring unit 307 determines whether or not the number of keywords acquired in the same layer of the same partial tree is larger than a predetermined number (1). In this case, the number of keywords acquired in the third layer of the partial tree 41 is not larger (equal to) the predetermined number (1). Thus, the keyword acquiring unit 307 acquires the tag of the node A12 as the keyword related to the user's interest. At this time, the keyword acquiring unit 307 updates the number of acquired keywords to four (4). Then, the keyword acquiring unit 307 determines whether or not the number of acquired keywords is larger than a predetermined number. Since the number of acquired keywords is not larger than the predetermined number at this point in time, the keyword acquiring unit 307 keeps exploring.

Next, the keyword acquiring unit 307 keeps exploring the partial tree 41, and then arrives at the node A13 (S8). The keyword acquiring unit 307 determines whether or not another node lower than the arrived node A13 is present. The node A13 has no lower node. Here, the keyword acquiring unit 307 updates the number of keywords acquired in the third layer of the partial tree 41 from one (1) to two (2). The keyword acquiring unit 307 determines whether or not the number of keywords acquired in the same layer of the same partial tree is larger than a predetermined number (1). In this case, since the number of keywords acquired in the third layer of the partial tree 41 is two and thus larger than the predetermined number (1), the keyword acquiring unit 307 does not acquire the tag of the node A13 as the keyword related to the user's interest. Then, the keyword acquiring unit 307 moves to a next node, and keeps exploring.

Figure 15:
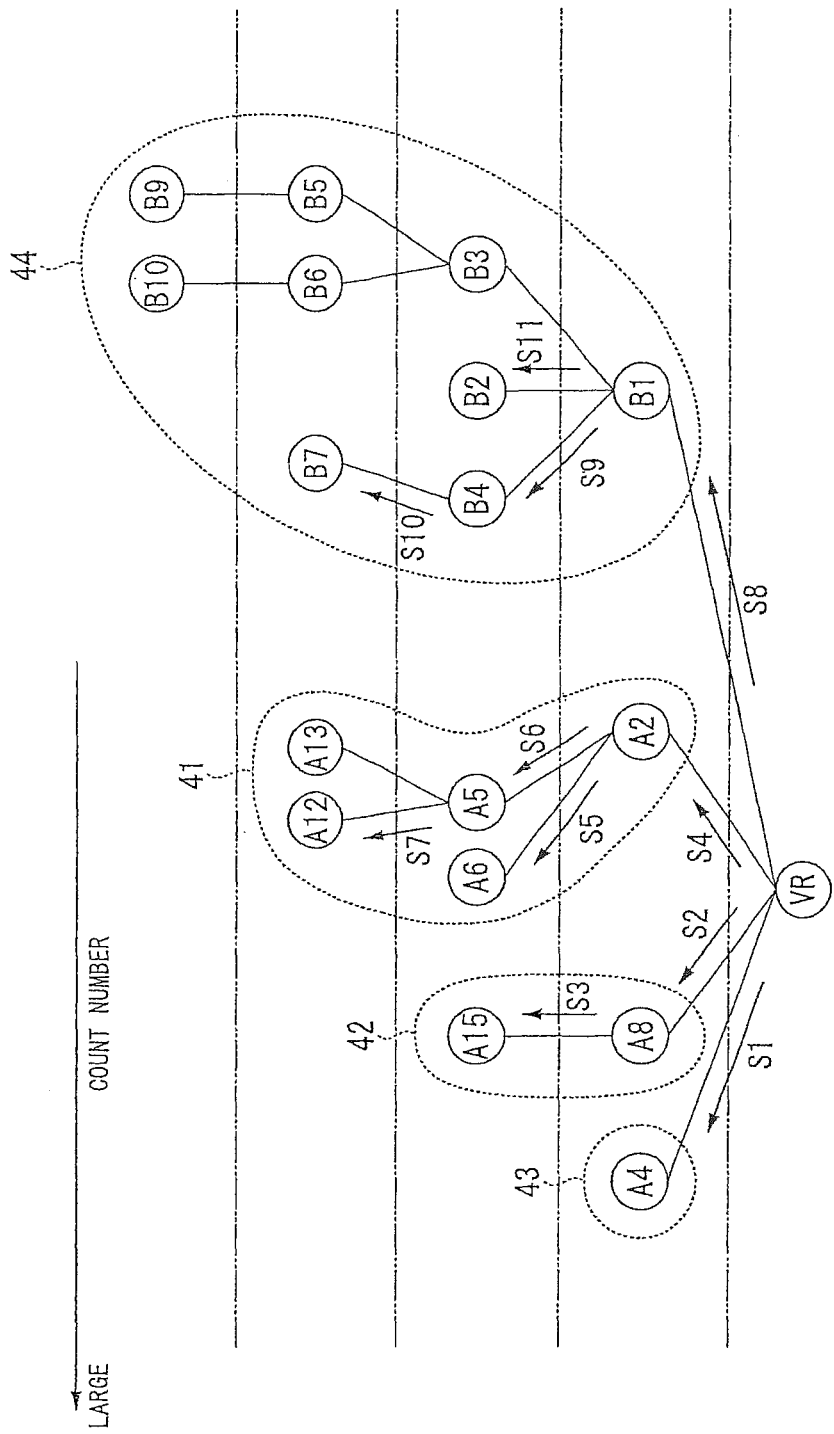
FIG. 15 is a diagram illustrating a second modified example of a method by which a keyword acquiring unit explores a partial tree.

FIG. 15 is a diagram illustrating a second modified example of the method by which the keyword acquiring unit 307 explores the partial tree. The number of keywords acquired in each partial tree may be limited to a predetermined number. In the example of FIG. 15, the number of keywords acquired in one partial tree is limited to two (2). The difference between the process of FIG. 15 and the process of FIG. 8 will be described below.

The keyword acquiring unit 307 explores the partial tree 41, arrives at the node A6 (S5), and then determines whether or not another node lower than the arrived node A6 is present. The node A6 has no lower node. Thus, the keyword acquiring unit 307 acquires the tag of the node A6 as the keyword related to the user's interest. At this time, the keyword acquiring unit 307 updates the number of acquired keywords to three (3). Then, the keyword acquiring unit 307 determines whether or not the number of acquired keywords is larger than a predetermined number. Since the number of acquired keywords is not larger than the predetermined number at this point in time, the keyword acquiring unit 307 keeps exploring. Further, the keyword acquiring unit 307 updates the number of keywords acquired in the partial tree 41 from zero (0) to one (1). The keyword acquiring unit 307 determines whether or not the number of keywords acquired in the same partial tree has reached a predetermined number (2). In this case, the number of keywords acquired in the partial tree 41 has not reached a predetermined number (2). Thus, the keyword acquiring unit 307 keeps exploring the partial tree 41.

The keyword acquiring unit 307 explores the partial tree 41, arrives at the node A12 through the node A5 (S6 and S7), and then determines whether or not another node lower than the arrived node A12 is present. The node A12 has no lower node. Thus, the keyword acquiring unit 307 acquires the tag of the node A12 as the keyword related to the user's interest. At this time, the keyword acquiring unit 307 updates the number of acquired keywords to four (4). Then, the keyword acquiring unit 307 determines whether or not the number of acquired keywords is larger than a predetermined number. Since the number of acquired keywords is not larger than the predetermined number at this point in time, the keyword acquiring unit 307 keeps exploring. Further, the keyword acquiring unit 307 updates the number of keywords acquired in the partial tree 41 from one (1) to two (2). The keyword acquiring unit 307 determines whether or not the number of keywords acquired in the same partial tree has reached a predetermined number (2). In this case, the number of keywords acquired in the partial tree 41 has reached the predetermined number (2). Thus, the keyword acquiring unit 307 ends the exploration of the partial tree 41, and starts to explore the next partial tree 44 (S8).

The partial tree exploring method of the keyword acquiring unit 307 has been described above with reference to FIGS. 8, 14, and 15, but the exploration of the partial tree may be performed by a combination of the plurality of methods.

(Advertisement)

Data (text, a still image, a moving image, or the like: hereinafter, referred to as "advertisement data") related to an advertisement other than moving image data may be provided to the user terminal 10 as content. For example, advertisement data associated with a keyword which the user has selected through the keyword display screen may be provided by an advertisement server. In this case, the advertisement server has the configuration similar to the moving image server 20, advertisement data is used instead of moving image data, and an advertisement ID is used instead of the moving image ID. The detailed operation is the same as described above in connection with selection of a keyword.

Further, advertisement data according to the keyword acquired by the keyword acquisition server 30 may be provided to the user. In this case, the advertisement server has the configuration similar to the moving image server 20, advertisement data is used instead of moving image data, an advertisement ID is used instead of the moving image ID, and an advertisement display limit is used instead of the recommendation limit. The detailed operation is the same as described above in connection with recommendation of a moving image.

(Others)

The log generating unit 305 may be configured such that the log of the same moving image ID is not recorded more than once in the log storage unit 304. Specifically, the log generating unit 305 may have the following configuration. First, when a new log is generated and recorded, the log generating unit 305 determines whether or not a moving image ID of the new log matches a moving image ID of a previously recorded log. Here, when mismatched, the log generating unit 305 records the new log in the log storage unit 304 as described above. However, when matched, the log generating unit 305 discards the new log and does not record the new log in the log storage unit 304.

The log generated by the log generating unit 305 need not necessarily include a moving image ID. The log generating unit 305 may record a tag and a user ID in association with other identification information as a log instead of a moving image ID. Alternatively, the log generating unit 305 may record the number of tags to record, a tag, and a user ID in association with one another as a log instead of a moving image ID. Through this configuration, even when the moving image ID is not recorded as a log, it is possible to appropriately identify a tag and a user ID of an oldest log which is a deletion target when the number of logs is larger than a predetermined number.

As described above, the exemplary embodiments of the present invention have been described with reference to the accompanying drawings, but a concrete configuration is not limited to the above embodiments and also includes a design or the like that is within the scope not departing from the gist of the invention.

What is claimed is:

1. A keyword acquiring device, comprising:
    a tree storage unit that stores a keyword tree obtained by performing hierarchization according to the number of appearances and relevance in advance using a keyword associated with content as a node;
    a log storage unit that records a keyword associated with content previously selected by a user as a log;
    a partial tree extracting unit that extracts a plurality of keywords based on a predetermined condition from a log corresponding to a certain user recorded in the log storage unit, and extracts a partial tree including the extracted keywords from the keyword tree; and
    a keyword acquiring unit that acquires a keyword in a node having no other lower node as a keyword related to the user's interest;
    wherein the keyword acquiring unit sorts each node of the partial tree for every two or more nodes having the same upper node based on a count number representing the number of keywords recorded in the log storage unit, explores the plurality of partial trees in order starting from a partial tree which is large in a count number of a highest node, and acquires a predetermined number of keywords from the partial trees.

2. A content providing system, comprising:
    a tree storage unit that stores a keyword tree obtained by performing hierarchization according to the number of appearances and relevance in advance using a keyword associated with content as a node;
    a log storage unit that records a keyword associated with content previously selected by a user as a log;
    a partial tree extracting unit that extracts a plurality of keywords based on a predetermined condition from a log corresponding to a certain user recorded in the log storage unit, and extracts a partial tree including the extracted keywords from the keyword tree; and
    a keyword acquiring unit that acquires a keyword in a node having no other lower node as a keyword related to the user's interest;
    a keyword storage unit that stores content and a keyword in advance in association with each other; and
    a content providing unit that provides content corresponding to the keyword acquired by the keyword acquiring unit to the user;
    wherein the keyword acquiring unit sorts each node of the partial tree for every two or more nodes having the same upper node based on a count number representing the number of keywords recorded in the log storage unit, explores the plurality of partial trees in order starting from a partial tree which is large in a count number of a highest node, and acquires a predetermined number of keywords from the partial trees.

3. The content providing system according to claim 2,
wherein the content providing unit receives a keyword selected by the user from a user terminal that outputs the keyword acquired by the keyword acquiring unit on a screen, and provides the content associated with the selected keyword in the keyword storage unit to the user.

4. A keyword acquiring method performed by a keyword acquiring device including a tree storage unit that stores a keyword tree obtained by performing hierarchization according to the number of appearances and relevance in advance using a keyword associated with content as a node, the method comprising:
   recording a keyword associated with content previously selected by a user as a log;
   extracting a plurality of keywords based on a predetermined condition from a log corresponding to a certain user recorded in the log;
   extracting a plurality of partial tree including the extracted keywords from the keyword tree;
   acquiring a keyword in a node having no other lower node as a keyword related to the user's interest;
sorting each node of the partial tree for every two or more nodes having the same upper node based on a count number representing the number of keywords recorded in the log storage unit;
   exploring the plurality of partial trees in order starting from a partial tree which is large in a count number of a highest node; and
   acquiring a predetermined number of keywords from the partial trees.

5. A computer-readable recording medium in which a computer program is recorded, the computer program causes a computer, which includes a tree storage unit that stores a keyword tree obtained by performing hierarchization according to the number of appearances and relevance in advance using a keyword associated with content as a node, to execute:
   recording a keyword associated with content previously selected by a user as a log;
   extracting a plurality of keywords based on a predetermined condition from a log corresponding to a certain user recorded in the log;
   extracting a partial tree including the extracted keywords from the keyword tree;
   acquiring a keyword in a node having no other lower node as a keyword related to the user's interest;
   sorting each node of the plurality of partial trees for every two or more nodes having the same upper node based on a count number representing the number of keywords recorded in the log storage unit;
   exploring the partial tree in order starting from a partial tree which is large in a count number of a highest node; and
   acquiring a predetermined number of keywords from the partial trees.

6. A content providing method performed by a content providing system including a tree storage unit that stores a keyword tree obtained by performing hierarchization according to the number of appearances and relevance in advance using a keyword associated with content as a node and a keyword storage unit that stores content and a keyword in advance in association with each other, the method comprising:
   recording a keyword associated with content previously selected by a user as a log;
   extracting a plurality of keywords based on a predetermined condition from a log corresponding to a certain user recorded in a log storage unit;
   extracting a partial tree including the extracted keywords from the keyword tree;
   acquiring a keyword in a node having no other lower node as a keyword related to the user's interest;
   providing content corresponding to the keyword acquired in the acquiring of the keyword to the user;
   sorting each node of the partial tree for every two or more nodes having the same upper node based on a count number representing the number of keywords recorded in the log storage unit;
   exploring the plurality of partial trees in order starting from a partial tree which is large in a count number of a highest node; and
   acquiring a predetermined number of keywords from the partial trees.

* * * * *